United States Patent
Ghirardi et al.

(10) Patent No.: US 9,781,815 B2
(45) Date of Patent: Oct. 3, 2017

(54) INTELLIGENT LIGHTING DEVICE, AND METHOD AND SYSTEM THEREOF

(71) Applicants: NEODELIS S.r.l., Turin (IT); POLITECNICO DI TORINO, Turin (IT)

(72) Inventors: Flavio Ghirardi, Turin (IT); Maurizio Martina, Turin (IT); Massimo Ruo Roch, Turin (IT)

(73) Assignees: NEODELIS S.R.L., Turin (IT); POLITECNICO DI TORINO, Turin (IT)

( * ) Notice: Subject to any disclaimer, the term of this patent is extended or adjusted under 35 U.S.C. 154(b) by 0 days.

(21) Appl. No.: 15/027,559

(22) PCT Filed: Sep. 29, 2014

(86) PCT No.: PCT/IB2014/064915
§ 371 (c)(1),
(2) Date: Apr. 6, 2016

(87) PCT Pub. No.: WO2015/052613
PCT Pub. Date: Apr. 16, 2015

(65) Prior Publication Data
US 2016/0242265 A1    Aug. 18, 2016

(30) Foreign Application Priority Data
Oct. 10, 2013   (IT) .............. TO2013A0818

(51) Int. Cl.
*H05B 37/02*     (2006.01)
*H04J 14/00*     (2006.01)
*H05B 33/08*     (2006.01)

(52) U.S. Cl.
CPC ........ *H05B 37/0272* (2013.01); *H04J 14/005* (2013.01); *H05B 33/0845* (2013.01); *Y02B 20/48* (2013.01)

(58) Field of Classification Search
CPC .............. H05B 37/0272; H05B 33/005; H05B 33/0845
USPC ................ 315/294, 291, 227, 297, 224, 307
See application file for complete search history.

(56) References Cited

U.S. PATENT DOCUMENTS

| | | | |
|---|---|---|---|
| 8,983,291 B1* | 3/2015 | Broekaert | H04B 10/524 398/115 |
| 9,432,298 B1* | 8/2016 | Smith | H04L 49/9057 |
| 2012/0051452 A1* | 3/2012 | Djordjevic | H04L 1/0057 375/295 |
| 2012/0216093 A1* | 8/2012 | Djordjevic | H03M 13/1171 714/755 |

(Continued)

FOREIGN PATENT DOCUMENTS

| | | |
|---|---|---|
| EP | 1 990 936 A1 | 11/2008 |
| WO | 02/25842 A2 | 3/2002 |

(Continued)

OTHER PUBLICATIONS

International Search Report dated Apr. 2, 2015.

*Primary Examiner* — Douglas W Owens
*Assistant Examiner* — Syed M Kaiser
(74) *Attorney, Agent, or Firm* — Arent Fox LLP (57) ABSTRACT

An intelligent lighting device is described, said device comprising optical means adapted to illuminate, and to transmit and receive an optical control signal.

19 Claims, 3 Drawing Sheets

(56) References Cited

U.S. PATENT DOCUMENTS

| | | | |
|---|---|---|---|
| 2012/0319592 A1 | 12/2012 | Riesebosch | |
| 2013/0091398 A1* | 4/2013 | Djordjevic | H04J 14/06 714/752 |
| 2013/0294782 A1* | 11/2013 | Liboiron-Ladouceur | H04B 10/616 398/202 |
| 2014/0375217 A1* | 12/2014 | Feri | H05B 37/0272 315/151 |
| 2015/0036571 A1* | 2/2015 | Taori | H04W 52/0235 370/311 |

FOREIGN PATENT DOCUMENTS

| | | |
|---|---|---|
| WO | 2009/090511 A2 | 7/2009 |
| WO | 2009/136312 A1 | 11/2009 |
| WO | 2013/108166 A1 | 7/2013 |

* cited by examiner

INTELLIGENT LIGHTING DEVICE, AND METHOD AND SYSTEM THEREOF

The present invention relates to an intelligent lighting device, as well as to a method and a system thereof.

It is known that intelligent lighting systems can adapt themselves to environmental conditions thanks to sensors and a control system, which allow them to automatically adjust themselves depending on the available light generated by other light sources (e.g. sunlight entering through a window), on the requirements programmed in the system (difference between day and night), and on the number of people that are present in that environment.

More in detail, systems are known wherein a control unit manages, according to specific criteria, the light generated by a series of light sources installed in one or more rooms. The most important characteristic of such devices is their capability of adapting their own luminous intensity to environmental conditions, based on data acquired from a number of sensors connected thereto. Such systems may store energy consumption data as well as data about people passing nearby. As a whole, all these measures provide energy savings in the range of 30% to 50% compared with traditional systems lacking a centralized control system.

However, systems thus conceived require the installation of a control unit connected to the light sources, and hence require that a modification be made to the existing electric system.

Systems also exist wherein light source control occurs via wireless communication. At any rate, the electric system needs to be modified for the purpose of providing the single light points or the single control switches with a wireless receiver.

It is also necessary to install additional sensors for detecting environmental light, presence of people, and any other parameters of interest that may be required for controlling the system.

Finally, all control units must be programmed by skilled personnel in order to be adapted to the structure of the environment where the light sources to be controlled are located.

It is therefore one object of the present invention to provide a device, a system and a method for intelligent lighting that allow controlling the lighting in residential, commercial or industrial environments without requiring any modifications to existing lighting systems, but only replacing the bulbs with the lighting devices of the present invention.

It is a second object of the present invention to provide a device, a system and a method for intelligent lighting that allow the devices to communicate with one another for coordinating the single brightness variations within an environment.

It is a third object of the present invention to provide a device, a system and a method for intelligent lighting that allow said communication to be restricted within each individual environment and to be resistant to external interferences.

It is a further object of the present invention to provide a device, a system and a method for intelligent lighting that can adapt the amount of emitted light on the basis of environmental parameters detected by the device itself.

These and other objects of the invention are achieved by a device, a system and a method for intelligent lighting as claimed in the appended claims, which are intended to be an integral part of the present description.

In brief, a device, a system and a method for intelligent lighting are described, said device comprising communication means configured for not being subject to external electromagnetic interferences, so as to ensure that the intelligent lighting device will function properly, i.e. to ensure a correct brightness level in accordance with control signals exchanged by said lighting devices. For example, control signals may include, without being limited to, controls of a variation of luminous intensity of the intelligent lighting device.

Further features of the invention are set out in the appended claims, which are intended to be an integral part of the present description.

The above objects will become more apparent from the following detailed description of a device, a system and a method for intelligent lighting according to the present invention, with particular reference to the annexed drawings, wherein.

Figure 1:
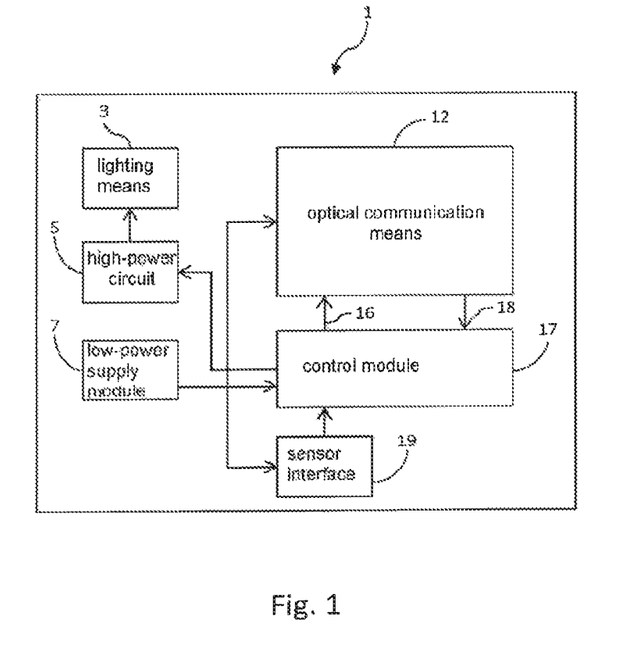
FIG. 1 shows an exemplary block diagram of a device according to the present invention.

With reference to FIG. 1, there is shown an exemplary block diagram of the lighting device 1 according to the present invention.

The lighting device 1 is, for example, a lamp for indoor domestic use, a lamp for outdoor domestic use, a lamp for industrial structures (warehouses, large business facilities, etc.), a street lamp, and the like.

The device 1 comprises optical means 3,12 adapted to illuminate, and to transmit and receive an optical control signal. Said optical means 3,12 comprise lighting means 3 and optical communication means 12, which will be described in detail below.

The device 1 further comprises a high-power circuit 5 that generates, starting from the electric power supply (e.g. electric grid or battery), the voltages necessary for driving the lighting means 3, preferably LED (Light Emitting Diode) lights. More in detail, such voltages depend on the number of LED lights, on whether they are galvanically isolated or not, and on the total power of the lighting device 1.

The device 1 further comprises a low-power supply module 7 that generates, starting from the power supply, the voltages necessary for driving all digital and analog modules comprised in the device 1.

In a preferred configuration, the high-power circuit 5 and the low-power supply module 7 are both electrically supplied by the electric line connected to the device 1. Two distinct circuits are necessary because the high-power circuit 5 requires more electric energy, the amount of which depends on the power of the lighting means 3, in particular the power of the LED lights.

The device 1 further comprises a sensor interface 19, the main function of which is to process first electric signals coming from sensors (not shown in the drawings) included in the device 1 or external thereto. Said first electric signals are sent to a control module 17, e.g. implemented by means of a microcontroller, which then uses them as inputs for an intelligent lighting algorithm, i.e. an algorithm that decides how and when to adapt the luminous intensity of the lighting means 3. The sensors may be proximity sensors for detecting people moving in the environment, brightness sensors, for evaluating the light level in the environment, temperature sensors, humidity sensors, and so on.

The device 1 further comprises the optical communication means 12, configured for transmitting and receiving optical control signals to/from one or more lighting devices, in particular of the same type as the device 1. Optical communication among devices 1 of the same type allows creating an exclusive communication channel among the devices 1 that are present within the same environment, as well as avoiding that the optical signal will propagate outside said environment. Let us think, for example, of a situation wherein the devices 1 are located in a shed, which is an environment delimited by walls and a roof, and wherein the optical signal allowing communication among the devices 1 will not propagate outside.

Figure 2:
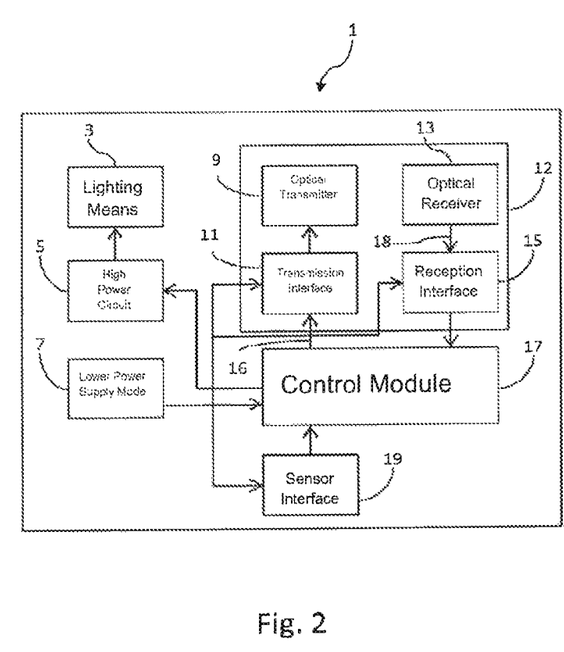
FIG. 2 shows a further exemplary block diagram of a device according to the present invention.

With reference to FIG. 2, the optical communication means 12 preferably comprise a transmission interface 11 connected to an optical transmitter 9, and a reception interface 15 connected to an optical receiver 13.

The transmission interface 11 receives from the control module 17 a second digital electric signal 16, appropriately coded and representing a control signal, and, together with the optical transmitter 9, transforms it into the optical control signal for transmission. The optical transmitter 9 then transmits said optical control signal to all the lighting devices 1 located within the same environment.

The optical control signal comprises data for controlling the brightness of the devices 1 and for configuring an operating state thereof, as will be detailed below.

The reception interface 15 is adapted to receive the optical control signal through the optical receiver 13, and they both convert it into a third digital electric signal 18 comprising a data (bit) stream relating to control information. The third digital electric signal 18 is sent to the control module 17 to be decoded and used for controlling the brightness level of the device 1, i.e. for coordinating the operation of the latter with that of the other lighting devices 1.

It must be pointed out that the control module 17 manages and controls the high-power circuit 5, the optical communication means 12, and the sensor interface 19. It performs the digital processing of all inputs (received from the sensor interface 19 and from the optical receiver 13), and, based on the data contained in the optical control signal, it modulates the brightness of the lighting means 3 and handles the transmission of information concerning its own state to the other lighting devices 1.

The device 1 also has the peculiarity that it can possibly transmit the optical control signal via the lighting means 3. In this case, the control module 17 sends the second digital electric signal 16, suitably coded, to the lighting means 3, which are modulated at a frequency of the order of kHz, or anyway at such a frequency that the human eye cannot perceive their luminous variations.

The following will describe in detail the above-mentioned elements comprised in the device 1 in accordance with a preferred embodiment of the invention.

As far as the high-power circuit 5 is concerned, it is a circuit adapted to convert an alternating (AC) or direct (DC) voltage, having a specific value characteristic of the electric grid it is connected to, into a low direct voltage to be specifically used for constant-current supply of the lighting means 3, in particular LED diodes. In such a configuration, the high-power circuit 5 comprises a first switching converter. The same converter can also be used in the case wherein the device 1 is powered by a battery.

The high-power circuit 5 allows, in any case, modulating the generated current through a command coming from the control module 17.

The optical communication means 12, the sensor interface 19 and the control module 17 are powered by the low-power supply module 7, which outputs a low-voltage supply (e.g. 3 or 5 Volt) and extremely low currents, e.g. up to a few tens of mA. Two configurations are possible for the low-power supply module 7:
  shunting the power voltage directly from the high-power circuit 5 through a suitable connection;
  shunting the power voltage via a DC-DC converter, the input of which is connected to the direct-current output of the high-power circuit 5, which is already used for driving the LEDs.

Both configurations offer the advantage that no second converter needs to be connected to the mains voltage supplied to the device 1.

In regard to the first configuration, it is indeed more economical, but poses a few implementation problems due to the fact that the control module 17 needs to be powered even when the lighting means 3 are off. In this latter condition, the output voltage of the low-voltage supply module 7 will therefore be lower than during the normal operation of the device 1. It follows that a voltage higher than necessary will have to be generated, and a post-regulator will have to be added to the low-power supply module 7. This will however reduce the overall efficiency of the device 1.

The second configuration, instead, substantially consists of a "step-down" converter, in particular a DC/DC converter, which receives at its input the drive voltage of the lighting means 3, and through its output supplies power to the control module 17. This second configuration differs from the first one in that the ratio between the input voltage and the output voltage of the low-power supply module 7 is very high, e.g. in the range of 10 to 20. This reduces, however, the output voltage generation efficiency, besides requiring a solution with a larger number of components.

The control module 17 is preferably a microcontroller with a 32-bit architecture. The control module 17 implements an algorithm for coding/decoding and digitally filtering the second 16 and third 18 digital electric control signals. The control module 17 further comprises at least one multi-channel A/D ("Analog-Digital") converter for reading the data from the sensors, and at least one D/A ("Digital-Analog") converter for transmitting the optical control signal and the brightness control of the lighting means 3. Furthermore, the clock frequency of the microcontroller is, for example, 48 MHz, thus ensuring sufficient computation power for the device 1.

As aforementioned, the optical communication means 12 are of the optical type, and therefore the optical signal is preferably transmitted via a first modulation, e.g. of the OOK ("On-Off Keying") type. On said basic first modulation, a second modulation can be superimposed, i.e. an error correction coding, preferably of the LDPC ("Low Density Parity Check") type, for the purpose of making the communication immune from interferences caused by other light sources.

The optical transmitted 9 is preferably a LED diode emitting light in an optical band predetermined by the LED diode manufacturer. The LED diode of the optical transmitter 9 is driven by the control module 17 according to a coding algorithm.

The device 1 also has the peculiarity that it can optionally transmit the optical control signal via the lighting means 3. In this case, the control module 17 sends the second digital electric signal 16, suitably coded, to the lighting means 3, which are modulated at a frequency of the order of kHz, or anyway at such a frequency that the luminous variations cannot be perceived by the human eye.

The optical receiver 13 preferably comprises a first photodiode, whereas the reception interface 15, which is located downstream of the optical receiver 13, comprises a first transimpedance amplifier and a narrowband band-pass filter. The reception interface 15 is also equipped with an integrator circuit, the function of which is to keep it in linear conditions, regardless of the level of environmental light. In fact, it must be pointed out that, since the optical receiver 13 and the reception interface 15 are integral parts of the device 1, which in practice is a light source because of the presence of the lighting means 3, the intensity of the optical signal received may vary by a few orders of magnitude, and it is nevertheless necessary to ensure the operation of the optical communication. The third digital electric signal 18 filtered at the output of the narrowband band-pass filter is then sent to the control module 17, which will take care of digitizing and decoding it.

The device 1 preferably comprises the following sensors:
- at least one environmental brightness sensor, comprising a second photodiode followed by a second transimpedance amplifier, which provided an indication of the brightness coming from a space volume around the device 1;
- at least one proximity sensor, i.e. a PIR ("Passive Infra-Red") sensor, followed by an electronic conditioning circuit detecting the presence/motion of people/objects.

This proximity sensor is optional, because it mainly detects the motion of people/objects. In fact, if a person is staying in the same environment as the device 1, but is not moving much or is not moving at all (e.g. a seated person reading a book), his/her presence will not be detected, or will only be detected at times.

Furthermore, the sensor interface 19 receives at its input a mains signal obtained by monitoring the mains voltage. The control module 17 requires continuous reading of the mains voltage (if the device 1 is supplied by an electric grid), in order to be able to properly adjust the brightness of the lighting means 3. In addition, the ubiquity of the mains signal within an environment (plurality of light sources) allows a generic clock reference to be created, which is shared by all the devices 1 that are present in said environment.

Figure 3:
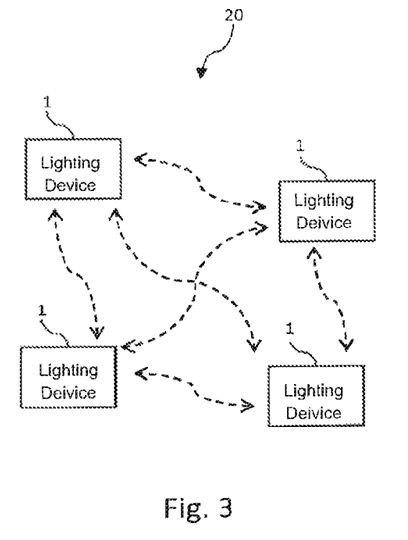
FIG. 3 shows an example of a system according to the present invention.

With reference to FIG. 3, there is shown an example of a system 20 in accordance with the present invention, which comprises a plurality of devices 1 that communicate with one another via the respective optical communication means 12 or lighting means 3. The communication among devices 1 of the same type utilizes a protocol that will be described below.

The definition of the communication protocol must take into account the particular functional requirements of the system 20, as well as the typical peculiarities of the transmission medium. More in detail, they are:
- the presence of high-power interfering signals on the communication channel (through the air). Within an environment there may be other light sources, whether with broad-spectrum emissions, such as compact fluorescent lamps, or other LED sources of the traditional type. Furthermore, incandescence lamps contribute to creating background noise that extends from the direct frequency up to a hundred of Hertz, with a modulation peak at 50 Hz;
- the necessity for confining the communication channel within physically delimited areas (e.g. rooms, passages, etc.). This constraint is automatically fulfilled by using optical communication;
- the possible coexistence of a plurality of intelligent light sources using similar technologies, but produced by different manufacturers. In the absence of a current standard, the system 20 must ensure a minimum communication functionality among devices 1 of the same type;
- the self-organization capability of the system 20. It must be possible to add or remove single devices 1 without the user being required to make any re-configuration.

The above requirements are fulfilled by the device 1 and the system 20 according to the present invention, in particular by means of the following features:
- the use of the first basic modulation for the optical control signal provides optical signals that are robust against interfering signals. Moreover, as aforementioned, it is well suited for use of the lighting means 3, which are already used for the illumination function, as transmitters of optical control signals;
- rejection of low-frequency background lighting through the first transimpedance amplifier and the integrator circuit. In addition, the (current and/or voltage) value outputted by the first transimpedance amplifier is an indirect measurement of environmental lighting, and can therefore easily replace the otherwise necessary light sensor;
- representation of "1" and "0" symbols of the optical control signals through the presence or absence of constant-frequency pulse trains. This symbol coding transforms the broadband second digital electric control signal 16 (pseudo-random sequences of bits) into a narrowband optical control signal centered around a carrier frequency of the pulse trains;
- rejection of high-frequency interfering signals by means of the narrowband band-pass filter. This is preferably included in the reception interface 15, and may be partially implemented also by using IIR ("Infinite Impulse Response") filters implemented in the control module 17. The narrowband band-pass filter prevents saturation of the third digital electric signal 18 inputted to the A/D converter of the control module 17, in addition to serving as an anti-aliasing filter. Furthermore, the IIR filter further attenuates any out-of-band interfering signals;
- rejection of in-band interfering signals through a code division technique, e.g. of the CDMA ("Code Division Multiple Access") type. Optical communication among devices 1 of the same type can also be attained by using the CDMA technique, also known as "spread spectrum", wherein each device 1 of the system 20 identifies itself within the system 20 by means of a univocal code of its own, i.e. a sequence of bits called "spread"/"despread" sequence. The set of spread sequences must have suitable statistic properties; in particular, each sequence must have self-correlation with an evident peak, and cross-correlation among sequences must be approximately null. In this manner, each device 1 will transmit its own optical control signal by using its own spread sequence. The overall over-the-air optical signal (in the communication channel) will thus be given by the sum of all the optical signals of every device 1 included in the system 20. However, due to the statistic properties of the spread sequences, it is possible, in reception, to discern the information contained in the optical signal coming from each lighting device 1. This operation is effected by computing the correlation between the overall optical signal and the spread sequence of the desired device 1. The signal produced by the desired device 1 will determine a peak in the correlation, whereas the other signals will appear as noise. Since the system 20 is an optical one, and is therefore based on binary modulation, real unipolar codes (0,1) must be used, which are different from the bipolar codes (−1,1) normally employed by wireless communication standards. The use of the code division technique, therefore, provides on the same transmission medium multiple simultaneous virtual channels that can then be used in two different modes.

In the simpler mode, all devices 1 of the same type that must communicate with one another transmit and receive information on the same virtual channel, equally dividing the available band, e.g. through a time division technique, also referred to as TDM ("Time Division Multiplexing"), wherein a device 1 acting as a "master" node assigns fixed time slots to each device 1. Alternatively, each device 1 communicates with the master node of the system 20 by using a different virtual channel, thus being independent of the others. Only the master node can simultaneously communicate on all virtual channels.

In reception, the optical control signal is saturated, oversampled and decoded, and must subsequently be synchronized with a local copy of the "despread" sequence. These operations are carried out by the control module 17, and synchronization is obtained by computing the correlation between the optical control signal received and all possible versions of the "despread" sequence that can be obtained by "shifting" the sequence by one position. As aforesaid, the statistic properties of the "spread"/"despread" sequences ensure that the correlation will have a maximum value when the optical control signal and the local "despread" sequence are aligned.

Let us now assume that P is the position, in the sequence of bits received, of the optical control signal that provides the highest correlation. Starting from the position P, one can execute the "despreading" operation in order to obtain the data of the optical control signal.

As aforesaid, the reception interface 15 is adapted to receive the optical control signal through the optical receiver 13, and converts it into a third digital electric signal 18 comprising a data (bit) stream relating to control information. The third digital electric signal 18 is sent to the control module 17 to be decoded. The decoding, or "despreading", operation multiplies the third digital electric signal 18 by the local "despread" sequence and accumulates the result. There is however no information about the alignment of the data in the bit sequence of the third digital electric signal 18 obtained after the "despreading" operation. This problem is overcome by adding a header to the data of the optical control signal during the transmission step. In fact, after the "despreading" operation the control module 17 will search for the header in the sequence of bits of the third digital electric signal 18 thus obtained. When the control module 17 finds the header in the sequence, the decoded bits will be aligned. In this way, the control data included in the optical signal, i.e. in the third digital electric signal 18, will be obtained. Alternatively, it is possible to use an external synchronization signal, e.g. the frequency (e.g. 50 Hz) of the mains to which the devices 1 are connected. The mains frequency represents, in this case, a clock reference that is common to all lighting devices 1.

In a preferred embodiment, therefore, the device 1 according to the present invention transmits the optical control signal by modulating the lighting means 3 at a certain frequency (e.g. of the order of some kHz) and codes said optical signal by using a code division technique wherein a univocal code is associated with each optical signal. In this manner, the device 1 can increase its transmission range thanks to the use of the lighting means 3 and their optical power; secondly, the binary modulation added to the code division coding (CDMA) of the optical control signal makes optical communication robust against noise and prevents, in reception, any mutual interference between the multiple optical signals that are present on the same communication channel.

Finally, the devices 1 of the system 20 are similar to nodes of a network communicating with one another. This is obtained through the definition of structurally identical nodes, wherein a broadcast-type communication channel is used for creating a network structure, and a functional communication channel is used for exchanging the information necessary for the normal operation of the system 20. The nodes, i.e. the devices 1, can assume three states that define, as a whole, a configuration procedure:

1. Learning: when the node (device 1) is turned on, it remains listening on a service channel to detect the presence or absence of a pre-existent network (system 20). In the affirmative case, the node switches into a configuration state (see next step) and negotiates the operating mode and parameters with the network. As an alternative, the node may act as a "master" node. In order not to disorientate a user in the proximity of the device 1, the lighting means 3 of the device 1 are active at 100% power.
2. Configuration: the node, while exchanging service information on the service channel, defines its own role in the network hierarchy (e.g. either "master" or "slave" node), as well as the channel to be used for the transmission of the optical control signal. The "master" node is automatically elected by the network of devices 1 based on the service information exchanged among them. Subsequently, the node switches into an operating state wherein the lighting means 3 stay always on at 100% power, even though brightness variations imperceptible to a user are used for calibrating the correlation between adjacent devices 1 (channel attenuation measurement).
3. Normal operation: The node (device 1) is an integral part of the network (system 20), and a continuous low-bitrate exchange of service information with the other network nodes, along with the monitoring of the available sensors, allows the operating mode of the node to be defined at best. The amount of light emitted by each device 1 is therefore a function of environmental light as well as of the operating parameters preset in the control module 17.

It must be pointed out that the state of each node (device 1) within the network (system 20) is not permanent over time; hence the configuration procedure must be repeated by each node (device 1) every time power is supplied thereto.

A further feature of the device 1 concerns an anti-theft/anti-tamper function. The control module 17 is univocally identified by a number stored therein. It may also contain further configuration information for disabling the operation of the lighting means 3, should the device 1 be removed from the system 20 to which it has been assigned (anti-theft/anti-tamper function). More in detail, the device 1 may refuse to turn on, or supply power to, the lighting means 3, should it be isolated or surrounded by an insufficient number of lighting devices of the same type as the device 1.

Alternatively, the anti-theft/anti-tamper function may be provided by storing each node into a list of nodes that must be reachable via the communication channel, and by setting a minimum acceptable number of such nodes. If the number of detected nodes is smaller than the minimum acceptable number, then the device 1, while still functioning, will not allow turning on the lighting means 3, i.e. the control module 17 will not command the activation thereof.

The method according to the present invention comprises the steps of illuminating, and transmitting an optical control signal, via optical means 3,12 of a lighting device 1.

The method also provides for modulating said optical control signal via a modulation, e.g. a binary one, of said lighting means 3 carried out by the control module 17 configured for modulating the amplitude, at a certain frequency (of the order of kHz), of the lighting means 3.

Furthermore, the method provides for superimposing a second modulation, i.e. an error correction coding, in particular an LDPC or "Low Density Parity Check" coding, on said modulation.

In addition, the method provides for coding the optical control signal, via the control module 17, by using a code division technique in which a univocal code, in particular a CDMA or "Code Division Multiplexing Access" technique, corresponds to the optical control signal.

The features of the present invention, as well as the advantages thereof, are apparent from the above description.

A first advantage of the device, system and method for intelligent lighting according to the present invention is that it ensures reliable communication among similar devices within the same environment.

A second advantage of the device, system and method according to the present invention is that it allows creating a self-organized network among similar devices within the same environment.

A third advantage of the device, system and method according to the present invention is that it allows multiple independent networks to coexist within the same environment.

A further advantage of the device, system and method according to the present invention is that it uses the devices' coordination capabilities in order to provide intelligent lighting control not requiring the use of a control unit and operating in a coherent manner within the environment.

A further advantage of the device, system and method according to the present invention is that it allows accurate monitoring of the environment through sensors incorporated into each device.

A further advantage of the device, system and method according to the present invention is that it allows the system to adapt its own behaviour based on the data detected by the sensors.

A further advantage of the device, system and method according to the present invention is that an anti-theft function is obtained, which provides a deterrent against theft of said device, since the latter will be unusable outside said system.

The device, system and method for intelligent lighting may be subject to many possible variations without departing from the novelty spirit of the inventive idea; it is also clear that in the practical implementation of the invention the illustrated details may have different shapes or be replaced with other technically equivalent elements. It can therefore be easily understood that the present invention is not limited to a device, a system and a method for intelligent lighting, but may be subject to many modifications, improvements or replacements of equivalent parts and elements without departing from the novelty spirit of the inventive idea, as clearly specified in the following claims.

The invention claimed is:

1. An intelligent lighting system, said system comprising a plurality of lamps, each lamp of the system comprising
    lighting means adapted to illuminate and to transmit a lamp optical control signal,
    a high power circuit for driving the lighting means,
    optical communication means adapted to receive an overall optical control signal and transmit said lamp optical control signal, the overall optical control signal being the sum of lamp optical control signals coming from the other lamps of the system, and
    a control module configured to control the high power circuit for modulating the brightness of the lighting means of the lamp,
    the control module being further configured
        to provide said lighting means or the optical communication means of the lamp with said lamp optical control signal containing data concerning its own state for transmission to the other lamps, and
        to receive from the optical communication means said overall optical control signal, the control module being adapted to discern the information contained in the lamp optical control signal coming from each lamp, so that the brightness of the lighting means of the lamp is modulated based on the data contained in the overall optical control signal received by the optical communication means.

2. An intelligent lighting system according to claim 1, wherein said optical control signal comprises commands relating to a variation of the light intensity of said lighting device for the purpose of ensuring a correct brightness level in an environment.

3. An intelligent lighting system according to claim 1, wherein said optical control signal is obtained via a modulation of the luminous intensity of said lighting means, carried out by the control module configured for modulating the amplitude, at a certain frequency, of the luminous intensity of said lighting means.

4. An intelligent lighting system according to claim 1, wherein said optical communication means comprise an optical transmitter, which is adapted to transmit said optical control signal, and which is driven by said control module according to a type of modulation.

5. An intelligent lighting system according to claim 1, wherein a second modulation including an error correction coding comprising a Low Density Parity Check (LDPC) coding, is superimposed on said modulation.

6. An intelligent lighting system according to claim 1, wherein said optical control signal is coded by said control module by using a code division technique in which a univocal code comprising a Code Division Multiplexing Access (CDMA) technique, is associated with said optical control signal.

7. An intelligent lighting system according to claim 1, wherein said optical control signal uses a unipolar code.

8. An intelligent lighting system according to claim 1, wherein said lighting means are LEDs, or Light Emitting Diodes.

9. An intelligent lighting system according to claim 1, wherein at least one lamp of said plurality of lamps acts as a master node automatically elected by said plurality of lamps on the basis of service information exchanged among said plurality of lamps.

10. An intelligent lighting system according to claim 1, wherein said plurality of lamps use a mains power frequency as a synchronization signal in order to obtain data from said optical control signal.

11. An intelligent lighting system according to claim 1, wherein a lamp of said plurality of lamps will supply no power to its own lighting means if said device does not detect the simultaneous presence of a minimum number of lamps of the same type as said lamp in said system, said minimum number being derived by said lamp on the basis of configuration information exchanged among said plurality of lamps.

12. An intelligent lighting method, said method comprising providing a network of lamps communicating with one another, each lamp of the network comprising lighting means adapted to illuminate and to transmit a lamp optical control signal, a high power circuit for driving the lighting means, optical communication means adapted to receive an overall optical control signal and transmit said lamp optical control signal, the overall optical control signal being the sum of lamp optical control signals coming from the other lamps of the system, and a control module configured to control the high power circuit for modulating the brightness of the lighting means of the lamp, the control module being further configured to provide the said lighting means or the optical communication means of the lamp with said lamp optical control signal containing data concerning its own state for transmission to the other lamps, and to receive from the optical communication means said overall optical control signal, the control module being adapted to discern the information contained in the lamp optical control signal coming from each lamp, and modulating the brightness of the lighting means based on the data contained in the received optical control signal.

13. The method of claim 12, wherein said method provides for illuminating, and for transmitting and receiving said optical control signal, via lighting means of said lamp.

14. The method of claim 12, wherein said method provides for modulating said optical control signal via a modulation of the luminous intensity of lighting means carried out by a control module configured for modulating the amplitude, at a certain frequency, of the luminous intensity of said lighting means.

15. The method of claim 12, wherein a second modulation, including an error correction coding comprising a Low Density Parity Check (LDPC) coding, is superimposed on said modulation.

16. The method of claim 12, wherein said method provides for coding said optical control signal, via said control module, by using a code division technique in which a univocal code comprising a Code Division Multiplexing Access (CDMA) technique, is associated with said optical control signal.

17. A lighting system, comprising:
a plurality of lamps, each lamp of the system comprising lighting means adapted to illuminate and to transmit a lamp optical control signal,
a high power circuit for driving the lighting means,
optical communication means adapted to receive an overall optical control signal and transmit said lamp optical control signal, the overall optical control signal being the sum of lamp optical control signals coming from the other lamps of the system, and
a control module configured to control the high power circuit for modulating the brightness of the lighting means of the lamp,
the control module being further configured
to provide said lighting means or the optical communication means of the lamp with said lamp optical control signal containing data concerning its own state for transmission to the other lamps, and
to receive from the optical communication means said overall optical control signal, the control module being adapted to discern the information contained in the lamp optical control signal coming from each lamp, so that the brightness of the lighting means of the lamp is modulated based on the data contained in the overall optical control signal received by the optical communication means
wherein the plurality of lamps use a mains power frequency as a synchronization signal in order to obtain data from said optical control signal.

18. The lighting system of claim 17, wherein at least one lamp of said plurality of lamps acts as a master node automatically elected by said plurality of lamps on the basis of service information exchanged among said plurality of lamps.

19. The lighting system of claim 17, wherein a lamp of said plurality of lamps will supply no power to its own lighting means if said device does not detect the simultaneous presence of a minimum number of lamps of the same type as said lamp in said system, said minimum number being derived by said lamp on the basis of configuration information exchanged among said plurality of lamps.

* * * * *